(12) United States Patent
Fritzsching et al.

(10) Patent No.: US 10,946,324 B2
(45) Date of Patent: Mar. 16, 2021

(54) ROUND FILTER ELEMENT, IN PARTICULAR FOR GAS FILTRATION

(71) Applicant: MANN+HUMMEL GmbH, Ludwigsburg (DE)

(72) Inventors: Torsten Fritzsching, Vaihingen (DE); Pascal Neef, Leonberg (DE); Robert Hasenfratz, Schwaebisch-Hall (DE); Christoph Wittmers, Bietigheim-Bissingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 16/386,374

(22) Filed: Apr. 17, 2019

(65) Prior Publication Data

US 2019/0308126 A1 Oct. 10, 2019

Related U.S. Application Data

(63) Continuation of application No. PCT/EP2017/073125, filed on Sep. 14, 2017.

(30) Foreign Application Priority Data

Oct. 17, 2016 (DE) .......................... 102016012330.3

(51) Int. Cl.
*B01D 46/24* (2006.01)
*B01D 46/00* (2006.01)
(Continued)

(52) U.S. Cl.
CPC ..... *B01D 46/2414* (2013.01); *B01D 46/0005* (2013.01); *B01D 46/125* (2013.01);
(Continued)

(58) Field of Classification Search
CPC ............ B01D 46/2411; B01D 46/2414; B01D 2275/208; B01D 2265/021;
(Continued)

(56) References Cited

U.S. PATENT DOCUMENTS

2010/0258493 A1 10/2010 Kindkeppel et al.
2016/0296867 A1* 10/2016 Stark ...................... B01D 46/52

FOREIGN PATENT DOCUMENTS

DE 102014016672 A1 5/2015
DE 102016003456 A1 10/2016
(Continued)

*Primary Examiner* — Robert Clemente
(74) *Attorney, Agent, or Firm* — James Hasselbeck

(57) ABSTRACT

A round filter element is provided with an elongate filter medium body with a wall structure flowed through by a fluid to be purified in a flow direction radially relative to a longitudinal axis of the filter medium body. A seal support for a sealing element is arranged adjacent to a radially outwardly positioned outer wall of the wall structure of the filter medium body and adjacent to an end face of the filter medium body. The seal support has across a major portion of its circumference a constant radial spacing relative to the outer wall of the wall structure of the filter medium body. The seal support has at least one radially inwardly oriented indentation located at a longitudinal side of the filter medium body and provided with a reduced radial spacing relative to the outer wall of the wall structure of the filter medium body.

11 Claims, 4 Drawing Sheets

(51) Int. Cl.
*B01D 46/52* (2006.01)
*F02M 35/024* (2006.01)
*B01D 46/12* (2006.01)

(52) U.S. Cl.
CPC ........ *B01D 46/2411* (2013.01); *B01D 46/521* (2013.01); *F02M 35/0245* (2013.01); *B01D 2265/026* (2013.01); *B01D 2271/027* (2013.01); *B01D 2275/208* (2013.01); *B01D 2279/60* (2013.01)

(58) Field of Classification Search
CPC ............ B01D 2265/026; B01D 46/521; B01D 46/0005; F02M 35/0201; F02M 35/02416; F02M 35/0245; F02M 35/02483
See application file for complete search history.

(56) References Cited

FOREIGN PATENT DOCUMENTS

| | | | |
|---|---|---|---|
| WO | 2009106589 | A1 | 9/2009 |
| WO | 2012110605 | A1 | 8/2012 |
| WO | 2012175438 | A1 | 12/2012 |
| WO | 2013104790 | A1 | 7/2013 |
| WO | 2013104791 | A1 | 7/2013 |

* cited by examiner

ROUND FILTER ELEMENT, IN PARTICULAR FOR GAS FILTRATION

CROSS-REFERENCE TO RELATED APPLICATIONS

This application is a continuation application of international application No. PCT/EP2017/073125 having an international filing date of 14 Sep. 2017 and designating the United States, the international application claiming a priority date of 17 Oct. 2016 based on prior filed German patent application No. 10 2016 012 330.3, the entire contents of the aforesaid international application and the aforesaid German patent application being incorporated herein by reference.

BACKGROUND OF THE INVENTION

The invention concerns a round filter element, in particular for gas filtration, for example, for an air filter, with a filter medium body whose wall structure can be flowed through by the fluid to be purified in radial direction relative to the longitudinal axis of the filter medium body, wherein the filter medium body comprises an elongate cross section shape.

WO 2012/110605 A1 describes an air filter element that comprises an elongate filter medium body which is flowed through radially by the air to be purified. The end faces of the filter medium body are flow-tightly sealed by an end disk, respectively. The filter medium body is embodied as a folded filter and comprises at its exterior side reinforcement ribs of a plastic material for stabilization. The filter element is flowed through radially from the interior to the exterior.

Moreover, WO 2013/104791 discloses a filter element as well as a filter system wherein the filter element is a rectangular flat filter element that has at its short sides two ears, respectively, that are positioned in the corner regions and extend parallel to an extension of the long sides away from the short sides. A sealing contour follows in this context the contour of the ears, respectively. The ears are moreover embodied such that they do not project past the corners past an imaginary extension of the long sides.

SUMMARY OF THE INVENTION

It is the object of the invention to embody a round filter element with an elongate filter medium body with simple constructive measures in such a way that with compact dimensions a high filtration efficiency is ensured.

This object is solved according to the invention in that, adjacent to the radially outwardly positioned outer wall of the filter medium body and adjacent to an end face of the filter medium body, a seal support is arranged which is carrier of a sealing element and across the major portion of its circumference comprises a constant radial spacing relative to the outer wall of the filter medium body but comprises at least one radially inwardly oriented indentation with a reduced radial spacing relative to the outer wall of the filter medium body, wherein the at least one indentation in the seal support is located at a longitudinal side of the filter medium body.

The dependent claims provide expedient further developments.

The round filter element according to the invention is preferably used for gas filtration, for example, for filtration of air, in particular in the intake manifold of an internal combustion engine of a vehicle. The filter element comprises an annularly closed filter medium body whose wall structure is flowed through by the fluid to be purified in radial direction. The filter medium body encloses an inwardly positioned flow space which is delimited by the inner wall of the filter medium body.

Advantageously, the fluid to be purified is introduced axially into the inwardly positioned flow space so that the inner wall of the filter medium body forms the raw side. The fluid flows through the wall structure of the filter medium body radially relative to its longitudinal axis from the interior to the exterior; the exterior side of the filter medium body forms correspondingly the clean side via which the purified fluid exits from the wall structure of the filter medium body. In an alternative embodiment, flow through the filter medium body radially from the exterior to the interior is possible also.

The axial end faces of the filter medium body are covered flow-tightly by end disks. One end disk comprises a central opening communicating with the inwardly positioned flow space for the axial flow guidance of the fluid, and, in contrast thereto, the oppositely positioned end disk is embodied of a closed configuration and seal-tightly closes the inwardly positioned flow space axially relative to the exterior.

Expediently, the end disk provided with the central opening is embodied rounded at its radial inner side whereby the inflow of the raw air into the interior in the filter medium body is facilitated. The radius of the rounded portion at the radial inner side of the end disk is advantageously larger than at the radial outer side. The radius at the radial inner side is configured, as needed, so large that the beginning of the radius at the end face is still located within the contour of the filter medium body.

The round filter element and the filter medium body are of an elongate configuration and comprise an oval or ovalized cross section shape. In case of ovalized cross section shapes, cross section shapes with parallel longitudinal sides and semi-circular narrow sides are possible also. Moreover, also concave or convex longitudinal sides with radially inwardly oriented curvatures or radially outwardly oriented curvatures are conceivable. Preferably, the inner wall and the outer wall of the filter medium body extend concentric to each other so that the filter medium body has a constant radial thickness.

The round filter element comprises a sealing element, in particular a circumferentially extending sealing ring, that is arranged at a seal support which is embodied separate from the end disk and is arranged adjacent to an end disk, in particular arranged relative to the raw-side end disk through which the unpurified fluid is introduced into the inwardly positioned flow space. The sealing element is positioned axially and radially at a spacing to the neighboring nearest end disk. By means of the sealing element, a flow-tight separation of the raw side from the clean side is realized. Due to the embodiment of the seal support separate from the end disk, the end disk is not subjected to the holding and sealing forces which are absorbed via the sealing element and the seal support in the installed situation of the round filter element. The end disk remains thus uninfluenced by the holding and sealing forces. Due to the spacing of the sealing element and of the seal support axially and radially relative to the neighboring end disk, seal support and sealing element also exhibit a spacing relative to the clean or exterior side of the filter medium body so that the fluid can exit, unhindered by the seal support and by the sealing element, via the clean side of the filter medium body. The seal support is fluid-tightly embodied and connects advantageously the nearest end disk fluid-tightly with the sealing element.

The seal support is spaced apart axially from the neighboring nearest end disk. Relative to the total axial height of the filter element, the axial spacing amounts to, for example, maximally 30% of the axial height, preferably maximally 20% of the axial height or maximally 10% of the axial height.

Across the major portion of its circumference, the seal support comprises a constant radial spacing relative to the outer wall of the filter medium body. Correspondingly, the outer side of the seal support projects radially past the outer wall of the filter medium body. The seal support is provided with at least one radially inwardly oriented indentation which interrupts the constant radial spacing between seal support and outer wall of the filter medium body, wherein the seal support in the region of the radially inwardly oriented indentation exhibits a reduced radial spacing relative to the outer wall of the filter medium body. The spacing between the seal support and the outer wall of the filter medium body can be reduced, as needed, to 0 so that the seal support in the region of the radial indentation contacts the outer wall of the filter medium body. However, conceivable is also a spacing larger than 0 so that no contact of the seal support at the outer wall of the filter medium body is provided.

This embodiment has the advantage that the filter housing for receiving the filter element can also be embodied with a reduced radial extension in the region of the radially inwardly oriented indentation. In the region of the indentation, for example, a housing-associated support sleeve can be provided, for example, a screw support sleeve for receiving a screw by means of which a housing cover can be connected to a filter base housing. The indentation in the filter element enables accordingly a reduced radial extension of a filter housing component in this section.

A further advantage of the radially inwardly oriented indentation resides in the possibility of determining a unique installation position of the filter element in the filter housing. In particular, in case of only one indentation or indentations that are asymmetrically distributed about the circumference, the filter element can be inserted into the filter housing only in precisely one defined installation position.

Advantageously, a receiving groove which serves for receiving the sealing element is introduced in the seal support. The receiving groove is located advantageously at the side of the seal support which is facing away from the nearest neighboring end disk. The receiving groove also follows the contour of the seal support and comprises in the region of the radially inwardly oriented indentation a reduced radial spacing relative to the outer wall of the filter medium body. In particular the radially inwardly positioned lateral boundary wall of the receiving groove, advantageously also the radially outwardly positioned boundary wall of the receiving groove, follow the contour of the seal support and comprise a reduced radial spacing relative to the outer wall of the filter medium body compared to the other sections. The receiving groove comprises a constant groove width, in particular across its entire length, i.e., also in the region of the reduced radial spacing relative to the outer wall of the filter medium body.

According to a further expedient embodiment, at least one indentation is provided in the seal support at one of the longitudinal sides of the filter medium body. As needed, at both longitudinal sides of the filter medium body one indentation can be provided, respectively. In this context, a symmetric positioning of the indentations, in particular symmetric to the longitudinal axis of the filter element, is conceivable as well as a non-symmetric arrangement.

According to a further expedient embodiment, only the sealing wall is provided with a limited radial indentation but not the filter medium body. Correspondingly, the outer wall of the filter medium body in the region of the radial indentation of the seal support is embodied without a radial constriction.

According to a preferred embodiment, the seal support is arranged at a support grid which is arranged at the clean side of the filter medium body (in case of flow from the interior to the exterior, as preferred). The support grid is located in particular at the outer wall of the filter medium body. A one-piece embodiment of support grid and seal support, which are embodied preferably as plastic components, is conceivable. The seal and holding as well as supporting forces are absorbed correspondingly by the seal support and the support grid while the filter medium body as well as the end disks are relieved of these forces.

According to a further advantageous embodiment, the seal support is embodied as a circumferentially extending support wall which is extending at a spacing relative to the outwardly positioned wall surface of the filter medium body. The support wall extends in particular parallel to the outwardly positioned wall surface of the filter medium body, with the exception of the at least one radially inwardly oriented indentation.

In installed position, the seal support is supported advantageously at a housing component, for example, at an inwardly positioned shoulder in a filter base housing that receives the filter element and onto which the housing cover can be placed. Advantageously, at least one end face of the support grid, as needed, both end faces, are embedded in the end disks. The end disk is comprised preferably of a softer material than the support grid and the seal support.

The filter medium body is preferably embodied as a folded filter with a plurality of filter folds. The filter folds extend preferably in, or approximately in, radial direction and thus in flow direction and extend at the same time axially between the two end faces of the filter medium body. The folded filter is embodied annularly closed.

In particular, precisely one filter medium body embodied as a round filter is arranged within the filter element.

According to a further advantageous embodiment, the round filter element comprises a cross section shape that tapers in axial direction so that the outer circumference of the round filter element in the region of the first end disk is of a different size compared to the outer circumference of the round filter element in the region of the oppositely positioned second end disk. The round filter element comprises an oval or ovalized cross section shape in the region of both end disks, respectively.

In case of a tapering cross section shape of the round filter element, the end disk at the end face with smaller outer circumference can be of a closed configuration and axially close off the inwardly positioned flow space while the oppositely positioned end disk at the larger outer circumference has a flow opening for introducing fluid into the inwardly positioned flow space.

Embodiments are also conceivable in which the end disk at the end face with larger outer circumference is of a closed configuration and axially closes off the inwardly positioned flow space, and the oppositely positioned end disk at the smaller outer circumference comprises a flow opening for introducing fluid into the inwardly positioned flow space.

At the end face, in particular at the top side of the seal support, knobs can be integrally formed, advantageously with axial spacing relative to the end face. These knobs have the function of a tolerance compensation and can compensate deviations of the seal support from a planar surface for attachment of the housing cover and/or the placement onto the shoulder in the filter base housing. The knobs are, for example, embodied rod-shaped and are positioned parallel to the side wall of the seal support; the rod-shaped knobs extend, for example, in radial direction. In installed position, the knobs press into the material of the housing component and compensate in this way tolerance deviations.

According to a further expedient embodiment, which preferably relates to a round filter element with a cross section shape tapering in axial direction, the smaller end disk has radially projecting support cams. Advantageously, these support cams project in radial direction no farther than the oppositely positioned end disk or the inner or outer contour of the oppositely positioned seal. However, a slight projecting length may be provided in order to obtain a particularly strong bracing action. The inner contour of seal support and/or sealing element extends advantageously in radial direction substantially along the outer circumference of the larger end disk.

The support cams are located preferably at the longitudinal sides and are in particular arranged at the end disk, preferably at the smaller end disk, in particular embodied as one piece together with the end disk and integrally formed thereat. However, it is also possible to arrange additionally at the narrow side one or several cams at the end disk. The cams project in radial direction past the end disk and support the round filter element in the installed state at the receiving filter housing.

A further aspect of the invention concerns a filter device with a round filter element as described above and with a filter housing for receiving the round filter element. The filter housing encompasses in particular also a housing cover which can be placed onto a filter base housing in order to close off the receiving space in the filter housing in which the filter element is inserted. At the filter base housing and/or at the housing cover, radial constrictions which correspond with the indentations can be arranged. In the region of the housing-associated constrictions, there are, for example, screw support sleeves for receiving screws by means of which the housing cover can be screw-connected to the filter base housing.

According to a further advantageous embodiment, at the inner side of the housing cover a preferably blade-shaped flow guiding rib is arranged which assists in the introduction of the fluid flow into the inwardly positioned flow space and in the uniform particle loading of the filter element in the filtration of the fluid, in particular also in case of non-symmetrical or non-parallel flow conditions. The unpurified fluid is preferably guided from the exterior radially in the direction toward the filter medium body and impacts then on the flow guiding rib at the inner side of the housing cover which influences the impacting fluid flow, for example, divides it into two and/or guides it axially in the direction toward the inwardly positioned flow space in the filter medium body.

Various embodiments of the flow guiding rib are conceivable. The flow guiding rib is either straight and embodied to be lying in a plane or, according to an alternative embodiment, is curved. The flow guiding rib can extend in case of a straight embodiment in axial direction of the filter element so that the wall sides of the flow guiding rib extend parallel to the longitudinal axis of the filter element.

The flow guiding rib can project into the flow opening which is introduced into the end disk of the round filter element through which the unpurified fluid is guided into the inwardly positioned flow space in the filter medium body.

According to a further expedient embodiment, a lateral inflow opening is introduced into the housing cover which is radially oriented and through which the unpurified fluid flows in radially. The flow guiding rib can be arranged adjacent to this inflow opening in the housing cover. The flow guiding rib can be positioned in such a way that the end face of the flow guiding rib is facing the inflow opening in the housing cover. The fluid flow which is radially supplied through the housing cover impinges on the flow guiding rib and is subjected to a deflection in the direction toward the inwardly positioned flow space in the filter medium body. The flow guiding rib and the inflow opening can be aligned at least approximately parallel.

Advantageously, a lateral inflow opening for the fluid to be supplied is also provided in the filter base housing of the filter housing wherein this inflow opening in the filter base housing and the lateral inflow opening in the housing cover overlap in the mounted state and form a continuous flow path for the supplied fluid.

According to a further expedient embodiment, the filter base housing is provided with a lateral, preferably radially oriented, outflow opening through which the purified fluid can flow out. It can be expedient that the outflow opening extends at least approximately parallel to the inflow opening as well as to the flow guiding rib.

According to a further expedient embodiment, the filter element in the installed state projects axially slightly past the end face of the filter base housing so that the removal of the filter element from the filter base housing, for example, for servicing purposes, is facilitated. The seal support with the sealing element is positioned at a small axial spacing to the projecting end face of the filter element and ensures the flow-tight separation between the outwardly positioned section of the filter element and the inwardly positioned section of the filter element received in the filter base housing.

BRIEF DESCRIPTION OF THE DRAWINGS

Further advantages and expedient embodiments can be taken from the additional claims, the figure description, and the drawings.

Same components are provided with the same reference characters in the Figures.

DESCRIPTION OF PREFERRED EMBODIMENTS

Figure 1:
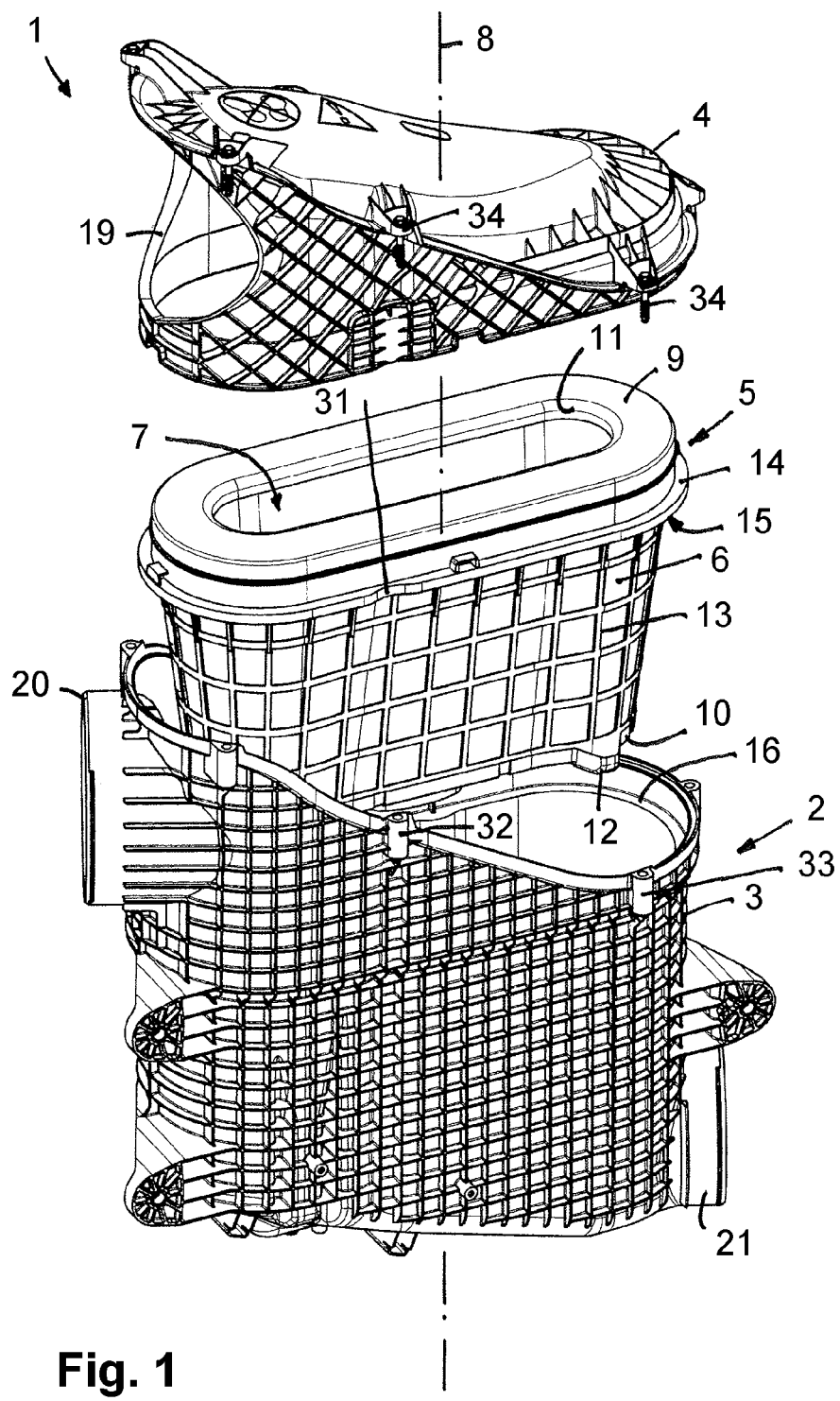
FIG. 1 shows in exploded illustration a filter device for gas filtration, with a filter base housing, a filter element, and a housing cover.

In FIG. 1, a filter device 1 is illustrated that is employed preferably for gas filtration, in particular for air filtration in the intake manifold of an internal combustion engine. The filter device 1 comprises a filter housing 2, which is comprised of a filter base housing 3 and a housing cover 4, and a filter element 5 that is insertable into the filter base housing 3. The housing cover 4 closes off the receiving space in the filter base housing for receiving the filter element 5.

Figure 2:
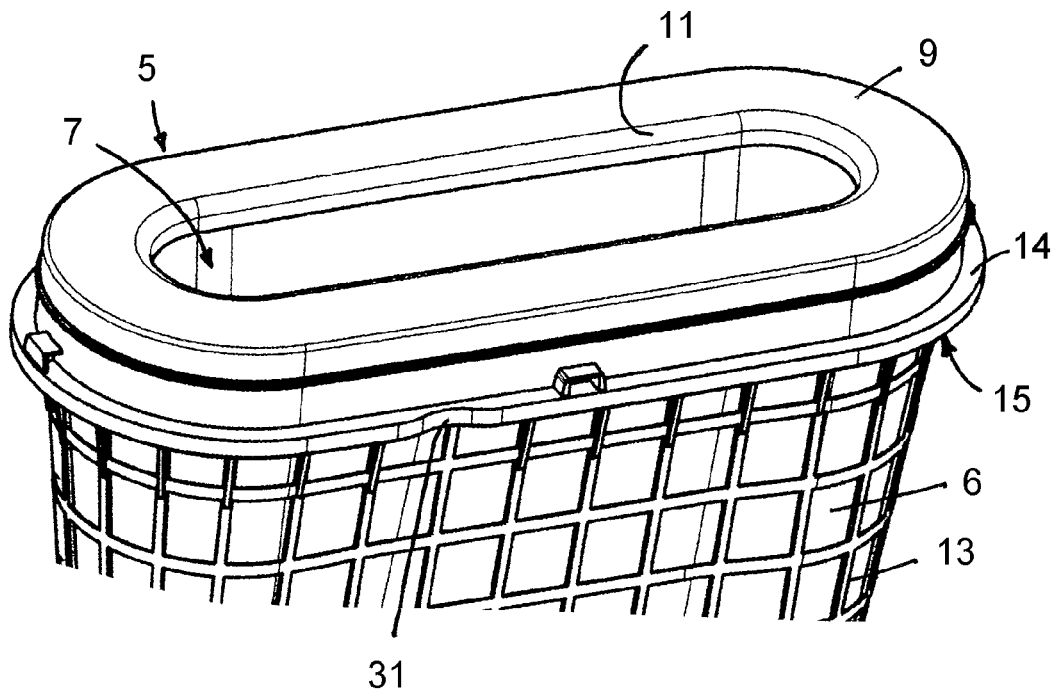
FIG. 2 shows in enlarged individual illustration the filter element that comprises a circumferentially extending seal support neighboring an end disk, wherein the seal support is provided with a radially inwardly oriented indentation.

The filter element 5, as can be seen in FIGS. 1 and 2, is provided with a filter medium body 6 at which the filtration of the fluid to be purified takes place. The filter element 5 is embodied as a round filter element; correspondingly, the filter medium body 6 is embodied also as a round element that encloses an inwardly positioned flow space 7 into which the fluid to be purified is introduced. The fluid is introduced axially, relative to the longitudinal axis 8 of the filter element 5 and of the filter device 1 (FIG. 1), into the flow space 7. Subsequently, the fluid flows through the wall structure of the filter medium body 6 radially from the interior to the exterior. Correspondingly, the inner wall of the filter medium body 6 forms the raw side and the outer wall the clean side.

Figure 3:
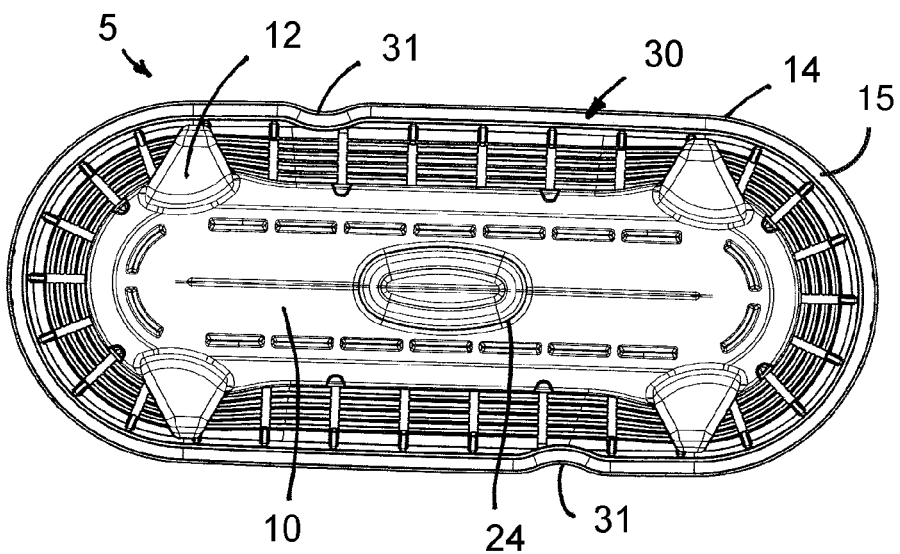
FIG. 3 shows a bottom view of a filter element with two indentations provided at oppositely positioned longitudinal sides.

The filter element 5 and the filter medium body 6 comprise a greatly ovalized elongate shape with two parallel extending longitudinal sides and semi-circular narrow sides. Moreover, the filter element 5, relative to its height, has a conical base shape in which the axially oppositely positioned end faces of the filter element 5 are embodied to be differently sized and comprise a differently sized outer circumference. The axial end faces of the filter medium body 6 are fluid-tightly covered by an end disk 9, 10, respectively, wherein the end disk 9 at the larger end face of the filter element 5 is of an open configuration and comprises a flow opening 11 through which the raw fluid can flow into the inwardly positioned flow space 7. The oppositely positioned end disk 10, on the other hand, as can be seen in FIG. 3, is of a closed configuration so that the inwardly positioned flow space 7 at this side is also axially closed.

At the closed end disk 10, cams 12 are formed which extend radially in outward direction and are positioned at the longitudinal sides adjacent to the narrow sides. The cams 12, which are formed as one piece together with the end disk 10, support the filter element 5 at the filter base housing 3 in the mounted state. In radial direction, the cams 12 do not project farther than the oppositely positioned larger end disk 9.

At the outer wall of the filter medium body 6, a support grid 13 is provided which is in particular manufactured of plastic material and is embodied separate from the end disks 9 and 10. The support grid 13 supports the filter medium body 6 at its outer wall in radial direction. Due to the radial flow through the filter medium body 6 from the interior to the exterior, an outwardly oriented pressure is generated in the filter medium body 6 which is absorbed by the support grid 13. This ensures that the filter medium body 6 does not deform due to the pressure of the fluid flowing through.

Adjacent to the end disk 9 in which the flow opening 11 for introduction of the raw fluid is provided, a seal support 14 is positioned which is carrier of a sealing element 15. The seal support 14 is configured as a circumferentially extending support wall which is positioned in a plane orthogonal to the longitudinal axis 8 and preferably is embodied as one piece together with the support grid 13. The seal support 14 is positioned at a minimal axial spacing relative to the top end disk 9 and with a significantly larger axial spacing relative to the bottom end disk 10. The outer circumference of the seal support 14 comprises a larger radial extension than the outer wall of the filter medium body 6.

The sealing element 15 is embodied as a sealing ring that is preferably inserted into a receiving groove in the end face of the support wall of the seal support 14 at the side which is facing away from the neighboring end disk 9. The sealing element 15 is facing away from the nearest end disk 9 and facing the oppositely positioned end disk 10 and, in the mounted state, is resting against a circumferential shoulder 16 (FIG. 1) at the inner wall of the receiving filter base housing 3. The shoulder 16 is positioned axially at a spacing to the upper end face edge of the filter base housing 3.

FIG. 3 shows that, at the bottom side of the seal support 14 which is facing away from the end disk 9, a circumferentially extending receiving groove 30 is provided which serves for receiving the sealing element 15. In the assembled state, the sealing element 15 in the receiving groove 30 is resting on the shoulder 16 at the inner wall of the receiving filter base housing 3 and separates the raw side from the clean side. The receiving groove 30 has a constant groove width about its length.

As illustrated in FIGS. 1 to 5, a radially inwardly oriented indentation 31 is provided at the seal support 14 which, relative to the further sections of the seal support 14, comprises a reduced radial extension. According to FIGS. 3 and 5, such radial indentations 31 are arranged at both oppositely positioned longitudinal sides of the filter element 5. The two radial indentations 31 are positioned mirror-symmetrical to the longitudinal axis 8 of the filter element.

The indentations 31 are designed in such a way that the radial spacing to the outer wall of the filter medium body 6 is reduced, wherein the spacing, as needed, can be reduced to zero so that the seal support 14 contacts the outer wall of the filter medium body 6. The filter medium body 6 has no such radial indentation or constriction but is embodied with a smooth wall and without radial tapering in the region of the indentation 31 of the seal support 14. The indentation 31 is produced in that a portion of the seal support 14, projecting radially past the outer wall of the filter medium body 6 and receiving the receiving groove 30 for the sealing element 15, is reduced with respect to its radial projecting portion. The inner and the outer boundary wall for limiting the receiving groove 30 are embodied to extend concentrically in the region of the radial indentation 31 so that the groove width remains constant even in the region of the radial indentation 31.

Figure 5:
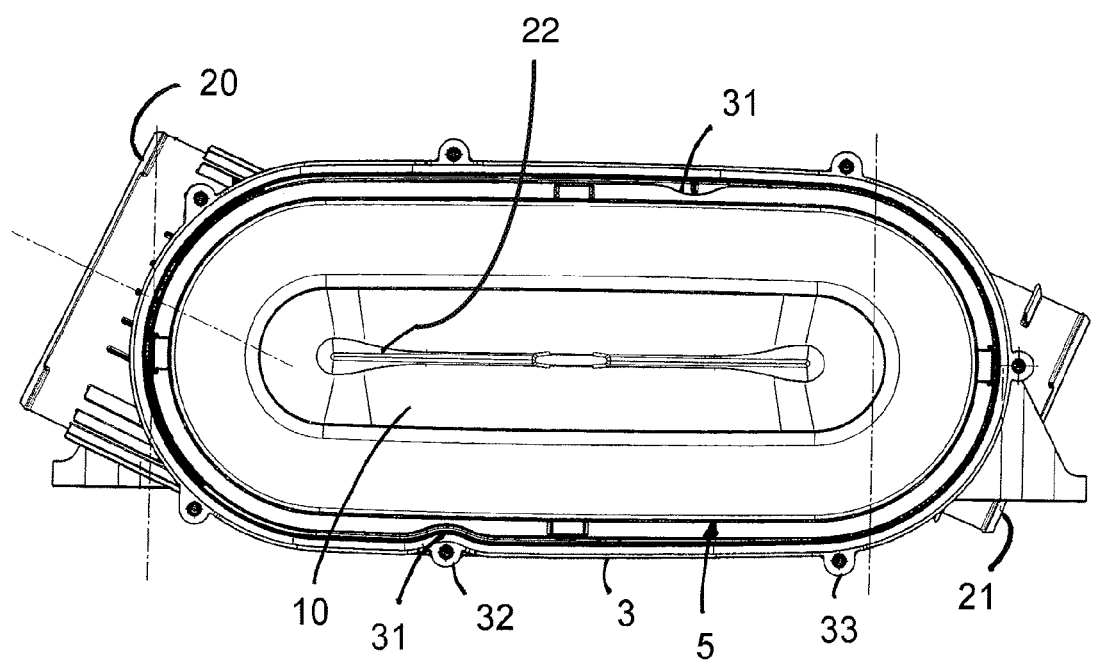
FIG. 5 shows a top view of the filter base housing with inserted filter element.

The radial indentation 31 makes it possible, as can be seen in FIG. 1 in connection with FIG. 5, that the screw support sleeve 32 at the filter base housing 3 in the region of the indentation 31 exhibits a smaller radial spacing than other screw support sleeves 33 wherein the screw support sleeves 32, 33 serve for receiving screws 34 (FIG. 1) at the housing cover 4. The screws 34 are also arranged in support sleeves which are formed at the housing cover 4; the support sleeve with the screw 34 which is correlated with the screw support sleeve 32 at the filter base housing 3 can also be arranged with reduced radial spacing, like the screw support sleeve 32.

In the housing cover 4, a lateral inflow opening 19 (FIGS. 1, 5) is provided through which the raw fluid can flow radially into the filter device. The inflow opening 19 in the housing cover 4 corresponds with a further inflow opening 20 which is provided in the filter base housing 3. When the housing cover 4 is attached, the inflow openings 19 and 20 are positioned to overlap so that a continuous flow path for the raw fluid is formed.

A lateral radial outflow opening 21 for discharging the purified fluid is provided at the filter base housing 3. The longitudinal flow axes of the inflow openings 19 and 20, on the one hand, and of the outflow opening 21, on the other hand, extend at least approximately parallel.

As can be seen in FIG. 3, an annular support part 24, with which the filter element 5 can be placed onto a housing-associated support sleeve, is centrally formed at the bottom end disk 10 at the side which is axially facing away from the inwardly positioned flow space 7. The support sleeve is provided at the bottom of the filter base housing 3. The annular support part 24 comprises an elongate cross section shape.

Figure 4:
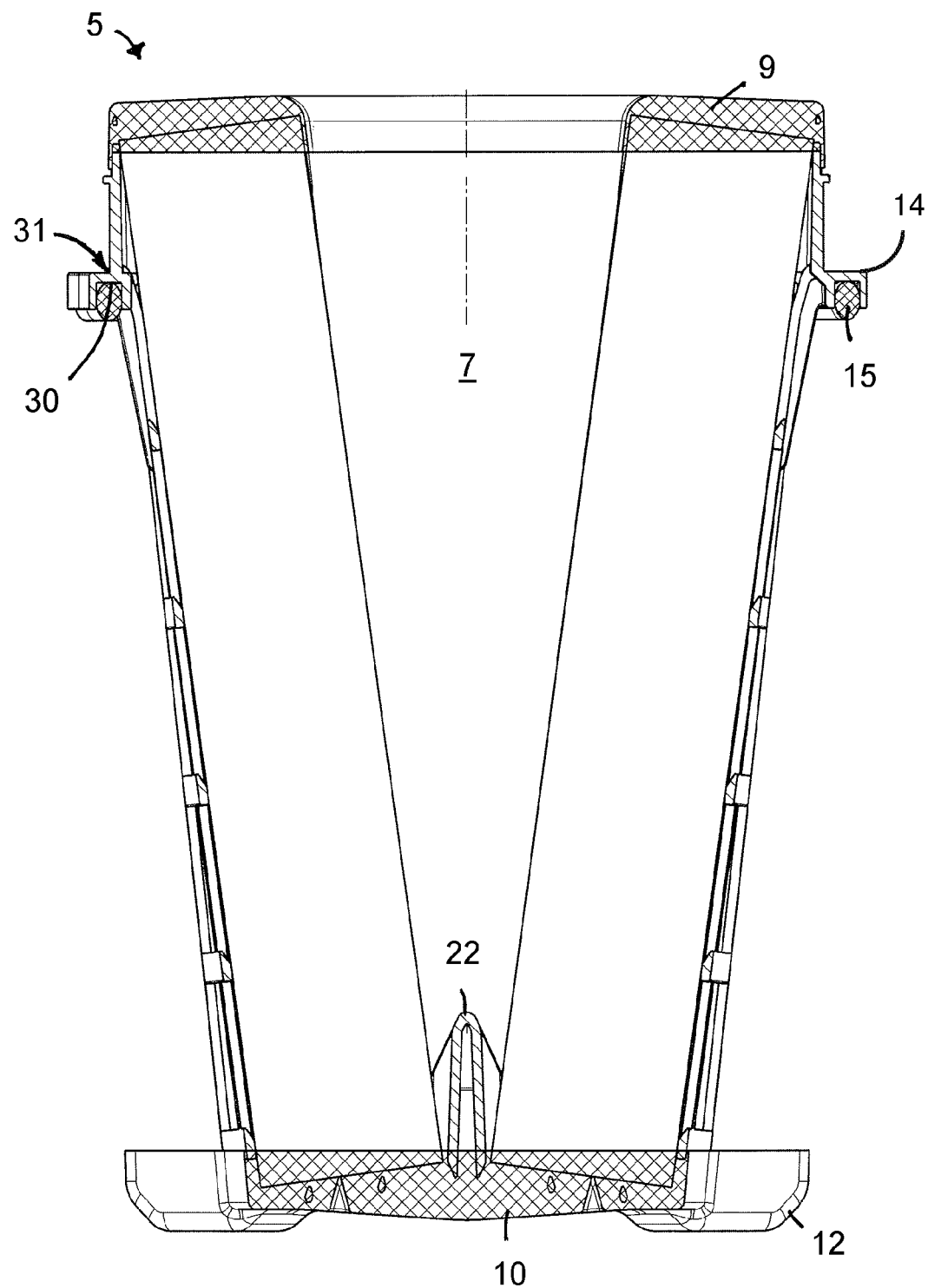
FIG. 4 shows a section lengthwise through a filter element.

As can be seen in FIGS. 4 and 5, in the bottom region of the filter element 5, adjacent to the bottom end disk 10, a shaped body 22 is provided which is formed in particular as one piece together with the support grid 13. The shaped body 22 projects axially into the inwardly positioned flow space 7 in the filter medium body 6 and provides for a stabilization of the filter medium body 6 which is embodied as a folded filter. The shaped body 22 tapers in a wedge shape toward its open end face and comprises in the central region a lowered support sleeve which projects into the bottom end disk 10. The radially outwardly positioned sections of the shaped body 22 also project into the end disk 10 so that a fixed connection between the shaped body 22 and the bottom end disk 10 is achieved. The shaped body 22 is at least substantially of a straight configuration and extends in longitudinal direction of the filter medium body 6. The radially outwardly positioned sections of the shaped body 22 are connected to the support grid 13 so that support and holding forces are absorbed by the shaped body 22 and the bottom end disk 10 is relieved.

What is claimed is:

1. A round filter element comprising:
    a filter medium body comprising
        a wall structure configured to be flowed through by a fluid to be purified in a flow direction radially relative to a longitudinal axis of the filter medium body,
    the filter medium body comprising
        an elongate cross section shape;
        a seal support configured to support a sealing element, wherein the seal support is arranged adjacent to a radially outwardly positioned outer wall of the wall structure of the filter medium body and adjacent to a first end face of the filter medium body;
        the seal support comprising, across a major portion of a circumference of the seal support, a constant radial spacing relative to the outer wall of the wall structure of the filter medium body;
        the seal support comprising at least one radially inwardly oriented indentation with a reduced radial spacing relative to the outer wall of the wall structure of the filter medium body,
        wherein the at least one radially inwardly oriented indentation of the seal support is located at a first longitudinal side of the filter medium body,
        wherein the seal support comprises a receiving groove configured to receive the sealing element,
        wherein the receiving groove comprises, in a region of the at least one radially inwardly oriented indentation, a reduced radial spacing relative to the outer wall of the wall structure of the filter medium body compared to a radial spacing of the receiving groove relative to the outer wall of the wall structure of the filter medium body in regions outside of the region of the at least one radially inwardly oriented indentation.

2. The round filter element according to claim 1, wherein the filter medium body comprises a second longitudinal side and
    wherein the at least one radially inwardly oriented indentation includes a first indentation arranged at the first longitudinal side and further includes a second indentation arranged at the second longitudinal side.

3. The round filter element according to claim 1, wherein the outer wall of the wall structure of the filter medium body in the region of the at least one radially inwardly oriented indentation is embodied without a radial constriction.

4. The round filter element according to claim 1, wherein a cross section surface of the filter medium body tapers from the first end face to an oppositely positioned second end face.

5. The round filter element according to claim 1, wherein a cross section surface of the filter medium body tapers in a direction of the longitudinal axis.

6. The round filter element according to claim 1, further comprising
    a support grid arranged at the wall structure of the filter medium body.

7. The round filter element according to claim 6, wherein the support grid is arranged at the outer wall of the wall structure.

8. The round filter element according to claim 6, wherein the support grid is arranged at the inner wall of the wall structure.

9. The round filter element according to claim 1, wherein the filter medium body is a folded filter comprising filter folds extending at least approximately in the flow direction of the fluid.

10. A filter device comprising:
    a filter housing;
    a round filter element comprising:
        a filter medium body comprising a wall structure configured to be flowed through by a fluid to be purified in a flow direction radially relative to a longitudinal axis of the filter medium body,
        the filter medium body comprising an elongate cross section shape;
        a seal support configured to support a sealing element,
        wherein the seal support is arranged adjacent to a radially outwardly positioned outer wall of the wall structure of the filter medium body and adjacent to a first end face of the filter medium body,
        wherein the seal support comprises, across a major portion of a circumference of the seal support, a constant radial spacing relative to the outer wall of the wall structure of the filter medium body,
        wherein the seal support comprises at least one radially inwardly oriented indentation with a reduced radial spacing relative to the outer wall of the wall structure of the filter medium body,
        wherein the at least one radially inwardly oriented indentation of the seal support is located at a longitudinal side of the filter medium body,
        wherein the seal support comprises a receiving groove configured to receive the sealing element,
        wherein the receiving groove comprises, in a region of the at least one radially inwardly oriented indentation, a reduced radial spacing relative to the outer wall of the wall structure of the filter medium body compared to a radial spacing of the receiving groove relative to the outer wall of the wall structure of the filter medium body in regions outside of the region of the at least one radially inwardly oriented indentation;
    wherein the filter housing is configured to receive the round filter element.

11. The filter device according to claim 10, wherein the filter housing comprises
    a filter base housing and
    an attachable housing cover, wherein a connecting element connecting the housing cover to the filter base housing is guided in the filter medium body through the at least one radially inwardly oriented indentation.

* * * * *